UNITED STATES PATENT OFFICE 2,652,553

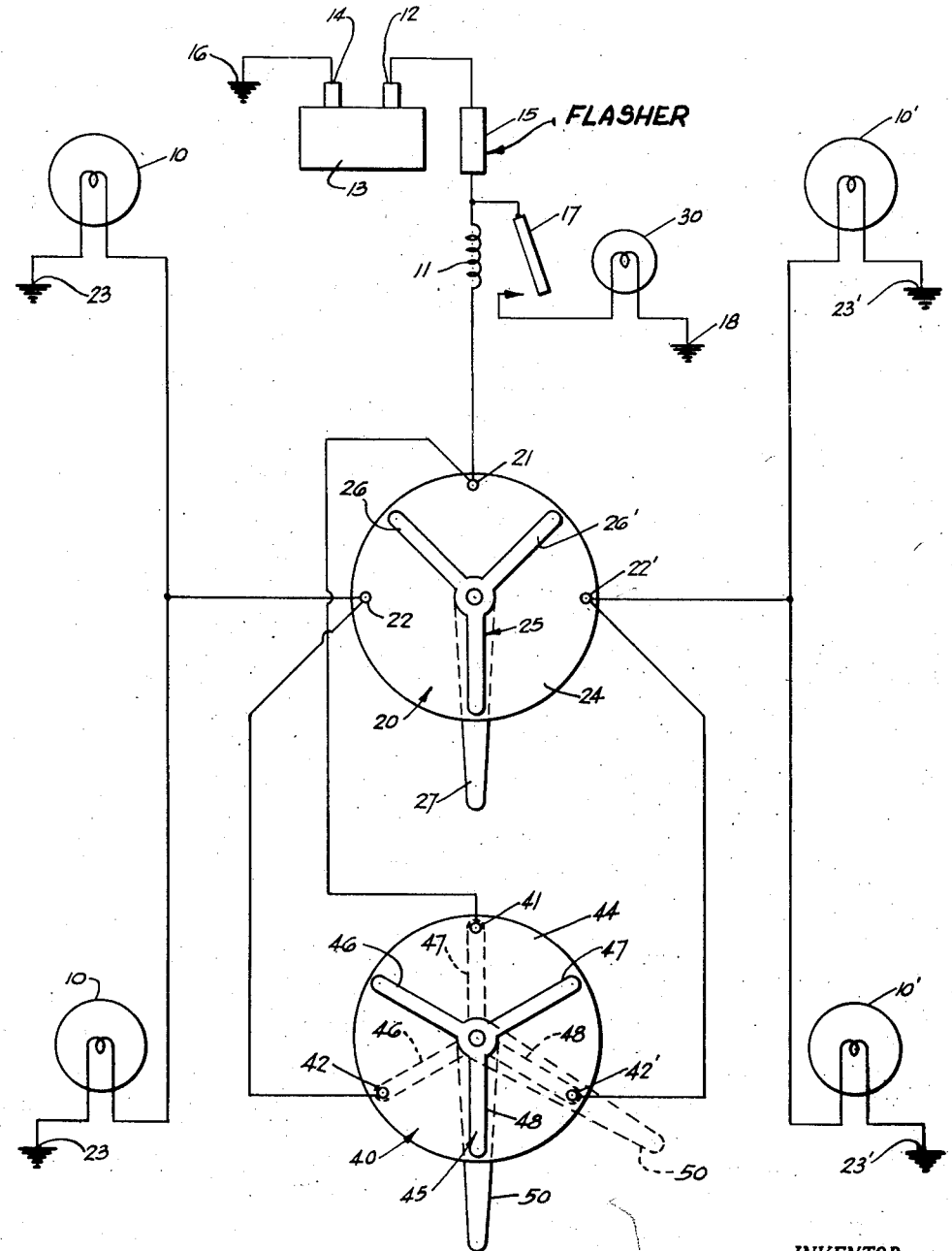

DIRECTIONAL SIGNAL SYSTEM

Jesse R. Hollins, Brooklyn, N. Y.

Application September 29, 1949, Serial No. 118,521

1 Claim. (Cl. 340—81)

This invention relates to vehicle signalling systems and, more particularly, to a novel circuit arrangement whereby a turn indicating signal system may be quickly and inexpensively adapted to provide an "emergency stop" signal with all the turn indicating signal devices being simultaneously energized.

Most present day automotive vehicles are equipped with means for indicating a proposed turning movement of the vehicle. Commonly, this means comprises signal devices, such as lamps, arranged on both sides of the vehicle, usually at the front and rear thereof, and a turn indicator or switch for selectively energizing the lamps on either side of the vehicle to indicate an imminent change of route of the vehicle. A flasher unit is included to "flash" the selectively energized signal lamps, and pilot or indicator lamps are provided to apprise the operator of energization of the signalling circuits.

Commercial vehicles, such as trucks, buses and the like are further equipped with clearance lamps on the front and rear ends, these lamps generally being required by law to be mounted on such vehicles. To reduce the expense of installing signalling circuits on such vehicles, my copending application Serial No. 79,878, filed March 5, 1949, for "Directional Lamp Switch," discloses a novel switch, associated with a flasher unit and a pilot lamp, whereby the "stop" and parking lamps of a vehicle can be used as turn indicating signals. Thus, the need for extra signal lamps for turn indication, and their associated wiring is eliminated.

When a vehicle makes an emergency stop on the highway, as for engine trouble, tire repair, or similar reasons, safety requires that adequate warning of the stalled vehicle be given to approaching vehicles. Frequently, such warning is given by flares set in the road before and behind the vehicle. While certain commercial vehicles are required to carry such flares, passenger cars are not, and frequently the latter have no adequate means of signalling an "emergency stop" condition. For this purpose, there is disclosed in my copending application Serial No. 87,010, filed April 12, 1949 for "Emergency Stop Flasher Signal System," a modification of the switch of my first-mentioned application, whereby all the "stop" and parking lamps of a vehicle may be flashed simultaneously to indicate an "emergency stop."

While this last-mentioned system is a very desirable improvement for vehicles not already equipped with a directional signal system, operators of cars having a factory installed turn signalling system are reluctant to undergo the expense of having the "emergency stop" system installed. For this purpose, the present invention is directed to a novel "emergency stop" or "flasher" switch which is inexpensive and quickly installed in association with a "turn indicator" switch to selectively simultaneously energize all the turn indicating lamps on the vehicle.

The invention switch is connected, in parallel or shunt circuit relation with the existing turn indicator switch, between the vehicle source of electric power and each of the turn signalling lamps. The switch includes a first fixed contact connectible to the "live" terminal of the battery or generator, or of the turn indicating switch, and second fixed contacts each connected to a signal lamp, or set of signal lamps, on different sides of the vehicle. The latter connections may be made to appropriate contacts of the turn indicator switch. A movable contact member is provided which is selectively movable from an "off" position disengaged from fixed contacts to an "on" position simultaneously connecting all such second contacts to such first contacts. Thereby, all the turn signalling lamps are simultaneously energized to indicate an "emergency stop" of the vehicle.

With the foregoing in mind, it is an object of the present invention to provide a novel "emergency stop" signalling system for a vehicle.

Another object to provide such a system including an inexpensive switch connected to the vehicle power source and the turn indicator lamps in parallel with the turn indicator switch and selectively operable to simultaneously energize all the turn signalling devices or lamps.

These, and other objects, advantages and novel features of the invention will be apparent from the following description and the accompanying drawing. In the drawing, the single figure is a schematic wiring diagram of an "emergency stop" signal system according to the invention.

Referring to the drawing, the invention system is illustrated as incorporated in a vehicle turn signalling system including turn indicating lamps 10, 10 and 10', 10', of which lamps 10 may be on the left side of the vehicle and lamps 10' on the right side. The lamps 10 and 10' are selectively energized by a turn indicator switch 20 which may be of conventional construction and which is schematically indicated as including a first or "live" fixed contact 21 and a pair of second fixed contacts 22, 22'. Contact 21 is connected, through a relay coil 11 and a flasher unit 15, to the "live" terminal 12 of a battery or other source of power 13 having its other terminal 14 grounded as at 16. Relay coil 11 controls an armature 17 which is closed, wherever flasher unit 15 is closed, to energize a pilot or indicator lamp 30 having one terminal grounded as at 18. The contact 22 is connected to one terminal of each of lamps 10, 10, the other terminals of these lamps being grounded as at 23, 23. Contact 22' is similarly connected to lamps 10', 10' grounded as at 23', 23'.

Switch 20 includes a base 24, of insulation material, on which the fixed contacts 21, 22, 22' are mounted in predetermined relation, for example 90° apart. A movable contact member 25 is pivotally mounted on base 24 and has a pair of arms 26, 26', extending at right angles to each other, and an operating handle 27. In the position of member 25 shown, the signal lamps are not illuminated.

To signal a proposed left turn, handle 27 is swung counter-clockwise to engage arm 26 with contact 22 and arm 26' with contact 21. Lamps 10, 10 are intermittently illuminated or "flashed" through the action of flasher unit 15, which may be of a conventional type. Each time unit 15 closes to illuminate lamps 10, current flowing through relay coil 11 closes armature 17 to simultaneously illuminate indicator or pilot lamp 30. Thus, the pilot lamp flashes simultaneously with the turn lamps. Should one or more of the latter fail to operate, the resulting reduced current flow through coil 11 is insufficient to operate armature 17, so that the pilot lamp 30 is not lit and apprises the operator of circuit trouble. A proposed right turn is indicated in the same way by moving handle 27 to engage arms 26, 26' with contacts 21, 22' respectively.

In accordance with the present invention, a "flasher" or "emergency stop" switch 40 is connected in parallel with turn indicator switch 20. Switch 40 includes a support plate 44 of insulating material on which are mounted a first fixed contact 41 and second fixed contacts 42, 42'. The number of second switch contacts corresponds to the number of second switch contacts of switch 20, and more than two may sometimes be necessary. All of the contacts on plate 44 are equally angularly spaced from each other. Switch 40 includes a movable contact member 45 having angularly related arms such as 46, 47, 48 corresponding in number to the fixed contacts and arranged with the same angular spacing. An operating handle 50 is provided for member 45.

To convert the turn signalling system to selectively provide an "emergency stop" signal, contact 41 is connected to "live" contact 21, contact 42 to contact 22, and contact 42' to contact 22', so that switch 40 is in parallel with switch 20. In the full line position shown in the drawing, the arms of member 45 are disposed between the fixed contacts 41, 42, 42'. To provide an "emergency stop" signal, handle 50 is moved one position in either direction, for example, to the illustrated dotted line position. Each arm of member 45 now engages one of the fixed contacts on plate 44, so that all of the lamps 10, 10' are simultaneously connected to source 13 through flasher unit 15 and thus simultaneously "flashed." Accordingly, a distinctive flashing "emergency stop" signal is provided in an inexpensive manner.

While a specific embodiment of the invention has been shown and described in detail to illustrate the application of the invention principles, it should be understood that the invention may be otherwise embodied without departing from such principles.

What is claimed is:

A vehicle signalling system comprising, in combination, a source of electric power, electrically operable signal lamps arranged one on each of the left and right sides of the vehicle, a first switch having a first fixed contact connected to said source, second fixed contacts each connected to a different lamp, and a movable contact member on said first switch selectively operable to connect one of said second contacts to said first contact to selectively illuminate one of said lamps, and a second switch connected to said source of power and in parallel with said first switch means and having a third fixed contact connected to said first fixed contact, fourth fixed contacts equal in number to said second fixed contacts and each connected to a different second contact, and a movable contact member on said second switch selectively operable to connect all of said fourth contacts simultaneously to said third contact to simultaneously illuminate all of said lamps to provide an emergency stop signal independently of the said first switch means whether said first switch means is connected or not to said signal devices.

JESSE R. HOLLINS.

References Cited in the file of this patent
UNITED STATES PATENTS

| Number | Name | Date |
|---|---|---|
| 1,417,419 | Smith | May 23, 1922 |
| 2,122,508 | Bell | July 5, 1938 |
| 2,188,451 | Bartens | Jan. 30, 1940 |
| 2,456,242 | Bailey | Dec. 14, 1948 |
| 2,456,498 | Franck | Dec. 14, 1948 |